United States Patent

[11] 3,633,090

| | | | | |
|---|---|---|---|---|
| [72] | Inventor | William Frank Hill<br>Stafford, England | | |
| [21] | Appl. No. | 46,602 | | |
| [22] | Filed | June 16, 1970 | | |
| [45] | Patented | Jan. 4, 1972 | | |
| [73] | Assignee | Joseph Lucas (Industries) Limited<br>Birmingham, England | | |
| [32] | Priority | July 28, 1969 | | |
| [33] | | Great Britain | | |
| [31] | | 37713/69 | | |

[54] BATTERY-CHARGING SYSTEMS
8 Claims, 3 Drawing Figs.

[52] U.S. Cl. .................................................. 320/39,
320/71, 322/91
[51] Int. Cl. .................................................. H02j 7/04
[50] Field of Search .......................................... 320/71, 39;
322/28, 91

[56] References Cited
UNITED STATES PATENTS

| 3,524,123 | 8/1970 | Williams et al. | 322/91 X |
|---|---|---|---|
| 3,456,182 | 7/1969 | Cummins et al. | 322/91 X |
| 3,320,509 | 5/1967 | Guglielmi | 320/39 |
| 3,270,270 | 8/1966 | Yenisey | 321/18 |
| 3,241,035 | 3/1966 | Rhyne, Jr. | 321/18 |

*Primary Examiner*—William M. Shoop, Jr.
*Attorney*—Holman & Stern

ABSTRACT: In a battery-charging system in which a three-phase permanent magnet alternator charges a battery, the three output lines of the alternator are coupled by two variable impedance means connected between two of the three pairs of output lines. Voltage-sensing means connected across the battery controls the impedances of the variable impedance means to regulate the battery voltage.

3,633,090

BATTERY-CHARGING SYSTEMS

This invention relates to battery-charging systems, particularly for road vehicles.

A battery-charging system according to the invention comprises in combination a three-phase permanent magnet alternator having three output lines connected to a three-phase rectifier, the output from which charges the battery, first variable impedance means connected between one pair of output lines of the alternator, second variable impedance means connected between a second pair of output lines of the alternator, and voltage-sensing means connected across the battery for controlling the impedance of said variable impedance means to regulate the battery voltage.

The invention can be utilized with a star-connected or a delta-connected alternator, and can also be used in an arrangement in which a pair of single-phase windings are connected in a Scott-T arrangement, in well-known manner, so that they effectively constitute a three-phase arrangement. The expression "three-phase alternator" is used herein to include such an arrangement, and in the specific case of the star-connected alternator and the Scott-T alternator, the invention can be modified by altering the position in which the variable impedance means are connected, as will be explained in the following description.

In theory, three variable impedance means are required but it has been found that one variable impedance means can be omitted. Although this does result in asymmetrical loading of the alternator phases under some circumstances, this loading is quite acceptable, so that the overall cost of the system can be reduced.

In the accompanying drawings.

Figure 1:
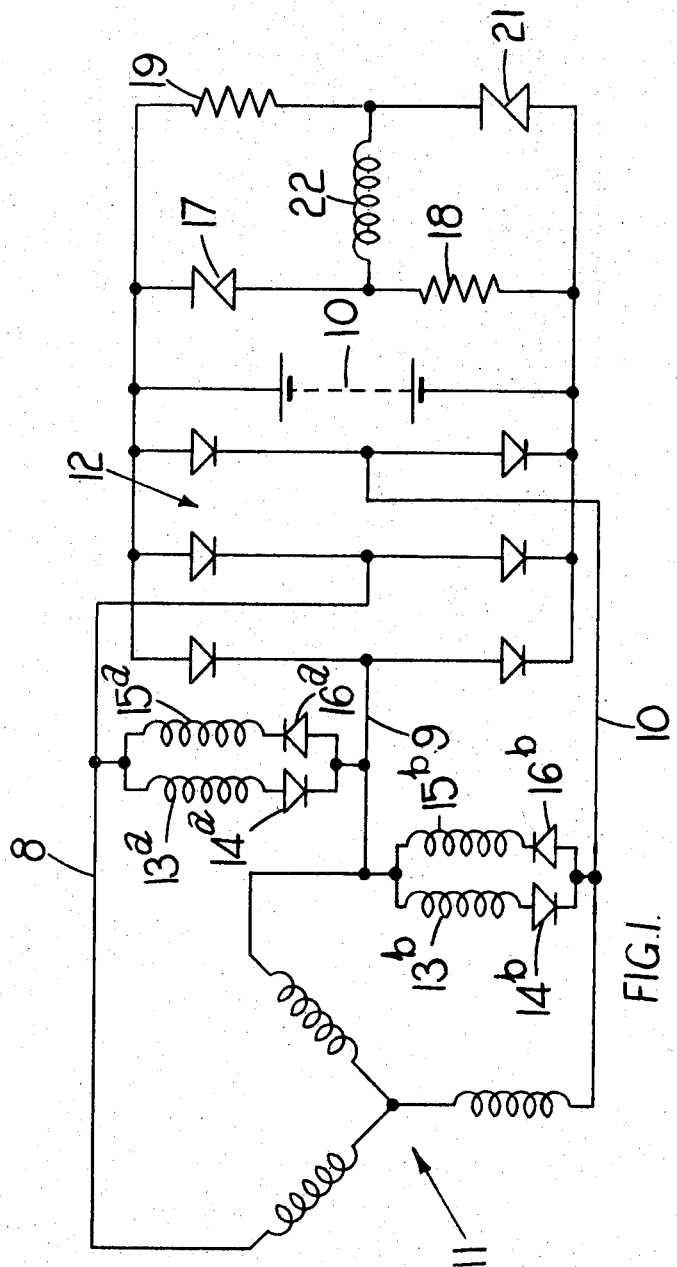
FIG. 1 is a circuit diagram illustrating one example of the invention.

Referring to FIG. 1 a three-phase star-connected permanent magnet alternator 11 has its phase points connected to three output lines 8, 9, 10 which provide an input to a three-phase full-wave rectifier 12, the rectifier 12 providing an output for charging a battery 10.

Connected in series between the lines 8, 9 is a saturable inductor 13a and a diode 14a, the inductor 13a and diode 14a being bridged by a further saturable inductor 15a and a diode 16a oppositely connected from the diode 14a. A similar arrangement is connected between the lines 9 and 10, including inductors 13b and 15b in series respectively with diodes 14b and 16b. The components connected between the lines 8 and 9 constitute a variable impedance means, as to the similar components connected between the lines 9 and 10. No variable impedance means is connected between the lines 8 and 10.

Connected across the battery in series are a Zener diode 17 and a resistor 18, while in parallel with the Zener diode 17 and 18 is a resistor 19 and Zener diode 21. The junction of the Zener diode 17 and resistor 18 is connected to one end of a winding 22, the other end of which is connected to the junction of the resistor 19 and Zener diode 21.

The arrangement is such that when the output voltage of the battery 10 is below a predetermined value, neither of the Zener diodes 17 and 21 conducts, and current flows through the resistor 19, the winding 22 and the resistor 18 in series. The winding 22 is magnetically coupled to the inductors 13a, 13b, 15b, and considering for the moment the variable impedance means connected between the lines 8 and 9, the operation is as follows. The inductors 13a and 15a are capable of conducting respectively the positive and negative half-cycles of the supply, by virtue of the diodes 14a and 16a. Both inductors 13a and 15a are of the self-saturating type, that is to say they have high remanence magnetic cores which are saturated by the pulses from the supply, so that the inductors normally present a low impedance. Current flowing through the winding 22 by way of the resistors 19 and 18 overcomes the self-saturating action of the inductors 13a and 15a, so that these inductors present a high impedance, and current will flow through the full-wave rectifier 12 to charge the battery 10. However, when a predetermined battery voltage is reached, the Zener diodes 17 and 21 will break down, and current then flows in the winding 22 in the opposite direction. The winding 22 now assists the self-saturating effect of the inductors 13a and 15a, which present a low impedance between the lines 8 and 9 and effectively short circuit the supply to the full-wave rectifier 12. It will of course be appreciated that the inductors 13b and 15b act in exactly the same way, and although there is no variable impedance means between the lines 8 and 10, it is found that the regulation achieved is satisfactory using an arrangement as shown.

It will of course, be appreciated that other forms of variable impedance means can be utilized.

The arrangement shown in FIG. 1 operates in exactly the same way if a delta-connected alternator is used. Such an alternator will of course have three output lines, and the variable impedance means shown are connected in exactly the same way.

Figure 2:
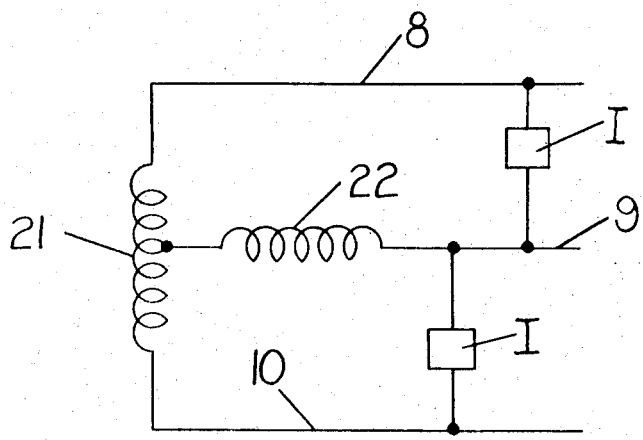
FIGS. 2 and 3 are circuit diagrams showing modifications of the arrangement seen in FIG. 1.

Are previously explained, it is possible to use a Scott-T connected alternator, and such an arrangement is shown in FIG. 2. The alternator includes two single-phase windings 21 and 22, the ends of the winding 21 being connected to the output lines 8 and 10 respectively, and the winding 22 having one end connected to an intermediate point on the winding 21, and its other end connected to the output line 9. The operation of the two single-phase windings to produce a three-phase output is well known, and is therefore not described. In FIG. 2, the variable impedance means which in FIG. 1 consists of the devices 13, 14, 15 and 16 are each indicated at I, and it will be seen that one such impedance I is connected between the lines 8 and 9 and the other impedance I is connected between the lines 9 and 10, so that the arrangement is exactly the same as that shown in FIG. 1. The rectifier 12 and other components are of course not shown in FIG. 2 or FIG. 3, since they are the same as in FIG. 1. The two means I can of course be connected between any two pairs of lines 8, 9, 10.

Figure 3:
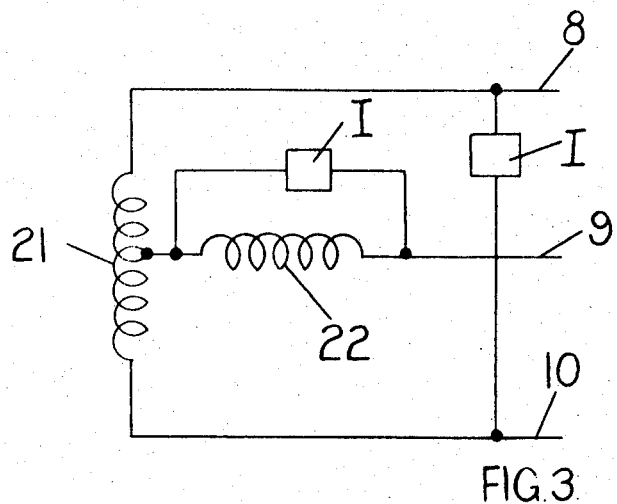

FIG. 3 shows an alternative connection of the impedances I where the Scott-T arrangement is utilized In this case, it is possible to connect one impedance I between the lines 8 and 10, and the other impedance across the winding 22. Such an arrangement produces satisfactory results. There are of course a large number of other possible connections of the two impedances I in FIG. 3, but none is satisfactory. Examples of unsatisfactory arrangements are with one impedance I connected across the winding 22 as shown and the other impedance connected across the lower half of the winding 21. The second example is with one impedance connected across the upper half of the winding 21 and the other impedance connected between the lines 9, 10. A third example is with one impedance across the winding 22 and the other impedance between the lines 8, 9, and a fourth example with one impedance across the upper half of the winding 21 and the other impedance between the lines 8, 9. In each of these cases, imperfect magnetic coupling between the upper and lower halves of the winding 21 prevents the system from operating satisfactorily.

It is also possible to use the principle shown in FIG. 3 for the star-connected alternator shown in FIG. 1. All that is necessary in such a case is for one impedance to be connected between one pair of supply lines, and the second impedance to be connected between the third supply line and the center point of the alternator. It is, however, necessary in such an arrangement to arrange for the two impedances to have different characteristics in order for a satisfactory result to be achieved, but this presents no great problem.

Having thus described my invention what I claim as new and desire to secure by Letters Patent is:

1. A battery-charging system comprising in combination a three-phase permanent magnet alternator having three output lines connected to a three-phase rectifier, the output from which charges the battery, first variable impedance means connected between one pair of phase points of the alternator, second variable impedance means connected between a second pair of output lines of the alternator, and voltage-sensing means connected across the battery for controlling the impedance of said variable impedance means to regulate the battery voltage.

2. A system as claimed in claim 1 in which the alternator is delta-connected.

3. A system as claimed in claim 1 in which the alternator is star connected.

4. A system as claimed in claim 3, modified in that one variable impedance means is connected between one pair of output lines, and the other variable impedance means is connected between the third output line and the center point of the alternator.

5. A system as claimed in claim 1 in which the alternator comprises a first single-phase winding and a second single-phase winding connected to a point on the first single-phase winding to constitute a Scott-T arrangement producing a three-phase output.

6. A system as claimed in claim 5, modified in that one of the variable impedance means is connected across the first winding, and the other variable impedance means is connected across the second winding.

7. A system as claimed in claim 1 in which each variable impedance means comprises a first saturable inductor and a first diode connected in series for passing current to one polarity, and a second saturable inductor and a second diode connected in series with one another across the series connection of first inductor and first diode for passing current to the other polarity, the voltage-sensing means including an output winding magnetically coupled to the inductors and serving to overcome the self-saturating effect of the inductors when the battery voltage is below a predetermined value.

8. A system as claimed in claim 7 in which the winding assists the self-saturating effect of the inductors when the voltage is above the predetermined value.

* * * * *